July 12, 1966 P. A. MANKIN ETAL 3,260,424
SWIVEL JOINT CONNECTING MEANS FOR THE FLEXIBLE DISPENSING
HOSE OF LIQUID DISPENSING APPARATUS
Filed Sept. 28, 1964 2 Sheets-Sheet 1

INVENTORS
PAUL A. MANKIN
LOWELL F. NELSON

BY

ATTORNEY

July 12, 1966 P. A. MANKIN ETAL 3,260,424
SWIVEL JOINT CONNECTING MEANS FOR THE FLEXIBLE DISPENSING
HOSE OF LIQUID DISPENSING APPARATUS
Filed Sept. 28, 1964 2 Sheets-Sheet 2
FIG. 3
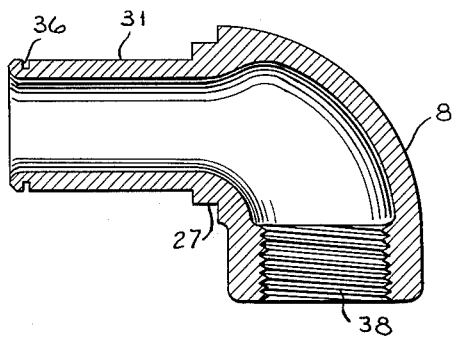
FIG. 4
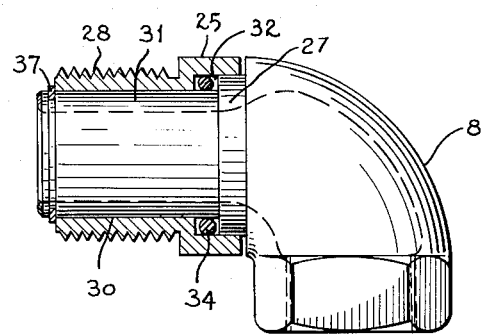
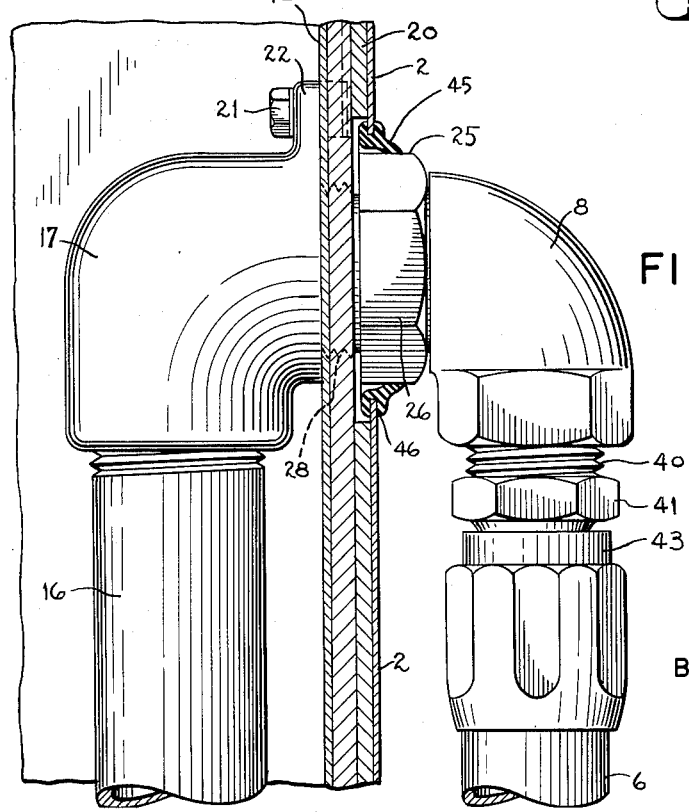
FIG. 5
INVENTORS
PAUL A. MANKIN
LOWELL F. NELSON
BY
ATTORNEY

United States Patent Office 3,260,424
Patented July 12, 1966

3,260,424
SWIVEL JOINT CONNECTING MEANS FOR THE FLEXIBLE DISPENSING HOSE OF LIQUID DISPENSING APPARATUS
Paul A. Mankin, North Muskegon, and Lowell F. Nelson, Muskegon, Mich., assignors to John Wood Company, East Orange, N.J., a corporation of Delaware
Filed Sept. 28, 1964, Ser. No. 399,532
4 Claims. (Cl. 222—529)

Our invention relates to improvement in liquid dispensing apparatus, such as, for example, gasoline dispensing apparatus of the type, shown generally in Design Patent No. 184,250, in common use in automobile service stations. Our invention relates more particularly to the connecting means of a gasoline dispensing apparatus between the outer end of the outlet conduit connected to the discharge outlet of the meter and the flexible dispensing hose, which has at its distal end a valve controlled dispensing nozzle. As is well known, both the meter and the outlet conduit connected thereto are within the housing of the gasoline dispensing apparatus.

Since the advent in recent years of gasoline dispensing apparatus which is of a considerably lower height than in the previous 25 years, or so, the lower height design of dispensing apparatus has presented a problem of the breakage of the flexible dispensing hose due to the frequent reverse bending thereof at the commonly used fixed outlet elbow positioned at the exterior of the housing of the apparatus. Such a problem of hose breakage has been experienced by all gasoline dispensing apparatus manufacturers.

Numerous unsuccessful attempts have been made by all manufacturers to solve the problem, such as by means as numerous types of swivel joint means at the connection between the distal end of the flexible dispensing hose and the inlet of the gasoline dispensing nozzle. Such swivel joint means have proven to be unsatisfactory in field use, because of frequent leakage at the swivel joint connection. Such leakage necessitates the discontinuance of the use of the apparatus until a new hose and nozzle, or a new swivel joint connecting means is installed between the hose and nozzle.

One object of our invention is to provide at the dispensing housing itself a built in swivel joint means, the swivel outlet elbow end of which is outside the outer housing of the dispenser apparatus, and to which outer elbow end the flexible dispensing hose is connected.

Another object of our invention is to provide a swivel joint means which would permit the swivel joint to be moved through a complete arc of 360°, although movement of the dispensing hose and nozzle through the complete 360° would be rather infrequent.

Another object of our invention is to provide a swivel joint means which will have a long life and which in all probability would not need to be replaced, or repaired, during the useable life of the dispensing apparatus.

Another object of our invention is to provide a built in swivel joint connection which may be, and has been, approved by Underwriters Laboratories, Inc. and without the necessity of providing the swivel joint means with an explosion proof type of fitting of any of the well known constructions.

Referring to said drawings;

FIG. 1 is a perspective view on a small scale illustrating the use of two gasoline dispensing apparatus on the island of an automobile service station, with the station attendant at the left hand portion of FIG. 1 shown dispensing fluid into the fuel fill pipe of the gasoline tank of an automobile, said fill pipe being located at the left hand side of the automobile as shown; and the dispensing apparatus at the right hand side, as in FIG. 1, showing the dispensing hose and nozzle turned approximately 225° clockwise to fill the gasoline tank of the type in common use in a tractor unit.

FIG. 3 is a vertical sectional view of the sleeve and elbow fitting of the outward extending portion of the swivel joint and to which elbow the inner end of the dispensing hose is connected.

FIG. 4 is an elevation view, partially in section, of the complete swivel joint, including the screw threaded bushing connection for the outlet of the elbow portion of the mounting bracket of the outlet pipe, which is positioned within the dispenser apparatus, and which outlet pipe is connected to the outlet of a meter (not shown) by which the volume of liquid is measured in the well known manner. The outlet shaft of the meter is connected to the drive shaft of the computing apparatus such as is in common use throughout the United States.

FIG. 5 is a fragmentary elevation view, partially in section, showing the swivel joint means connected to the outlet elbow of the mounting bracket, which outlet elbow is connected at its inlet opening with the screw threaded end of the outlet pipe connected to the meter outlet.

Figure 1:
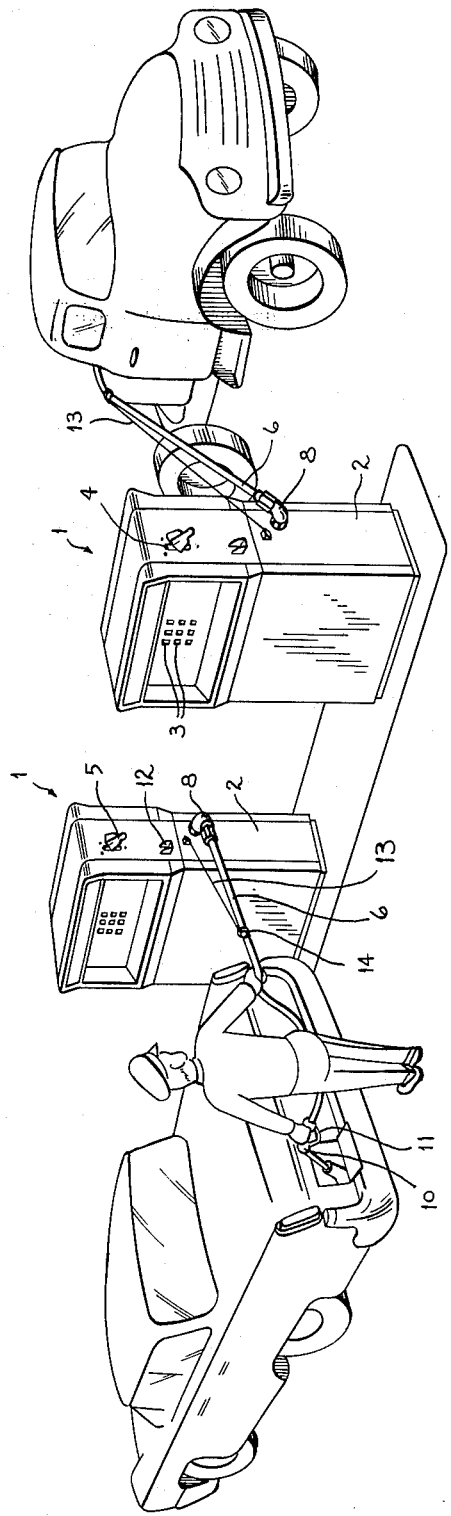
Figure 2:
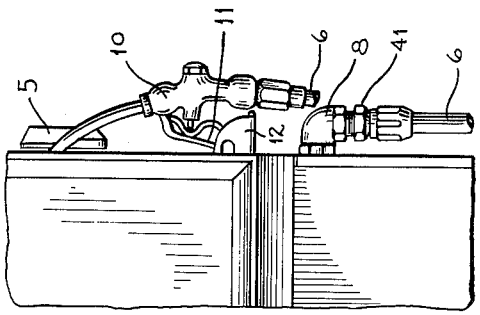
FIG. 2 is a fragmentary side elevation view of a portion of the outer housing showing the nozzle positioned on a nozzle support, and with the outlet end of the nozzle positioned in a nozzle boot with the hose connected to the swivel joint in approximately a vertical position with respect to the island.

Referring more particularly to FIG. 1; the reference mark 1 indicates a gasoline dispensing apparatus of the general type commonly used in service stations throughout the United States. The gasoline dispensing apparatus is provided with an outer housing, including side panels 2. The gasoline dispensing apparatus 1 includes a computing mechanism of the construction commonly used in gasoline dispensing apparatus, and of a construction such as shown generally in Bliss Patent No. 2,814,444 and Slye Patent No. 2,111,996. The numbers on the dial wheels of the computing apparatus appear through the window openings 3, and indicate the total value of the liquid dispensed, the volume of liquid dispensed, etc. The housing of the gasoline dispensing apparatus includes a nozzle boot 4 which is covered by the means 5 when the nozzle has been removed from the nozzle boot 4 and the mechanism turned on to dispense liquid, such as gasoline, etc.

The flexible dispensing hose 6 is connected to the elbow 8 of the built in swivel joint connecting means hereinafter described. The distal end of the hose 6 is provided with a manually operated valve controlled dispensing nozzle 10 of the well known type. When the operator has completed the dispensing operation, the means 5 is moved in a clockwise direction which turns off the mechanism and uncovers the opening of the nozzle boot 4, and the outer end portion of the nozzle 10 is inserted in the nozzle boot 4, and with the handle portion 11 thereof positioned on the nozzle support 12.

If desired, the flexible dispensing hose 6 may be connected by a flexible means 13, such as nylon cord, to a fitting 14 rigidly clamped on the hose 6, said flexible cord 13 being provided with retracting means within the pump housing of the gasoline dispensing apparatus 1, in the manner as is well known in the art. Of course, if the hose 6 be provided with a flexible cord 13 and fitting 14, it is obvious that it would be impracticable to rotate the swivel joint means with attached hose 6, cord 13, and fitting 14 through complete 360° turns.

Referring more particularly to FIGS. 2 to 5 inclusive; the outlet pipe 16 is connected to the outlet of the meter (not shown) of the dispensing apparatus, in the manner as is well known in the art. The discharge end of the outlet pipe 16 is in scr w threaded connection with a screw threaded opening in the inlet of the elbow portion 17 of the mounting bracket 18, which is rigidly connected to the inner side of the frame member 20 by screw means 21 which pass through openings formed in the flange portion 22 of the elbow 17. Said screw means 21 holds the outlet elbow 17 rigidly connected to the mounting bracket 18 and the frame member 20.

The built in swivel joint means includes a cylindrical bushing member 25 which has a hexagonal head portion 26 and an inwardly extending outer screw threaded portion 28. The screw threaded portion 28 is adapted to be rigidly connected to a mating screw threaded opening at the outlet side of the elbow 17. The bushing 25 is provided with an axial elongated smooth bore 30 which is adapted to be rotatably engaged by the outer smooth surface of the elongated extension portion 31 of the elbow fitting 8, as best shown in FIG. 3. The head portion 26 of the bushing 25 is provided with an annular recess 32 of a larger diameter than said bore 30, forming a shoulder in which an O ring 34 is positioned to form a fluid type joint between the bushing 25 and the elongated extension portion 31 of the elbow 8. The elbow 8 has a reduced diameter portion 27 rotatably fitted in the annular recess 32 of the bushing 25, as best shown in FIG. 3.

As shown in FIGS. 3 and 4, the inner elongated portion 31 of the elbow 8 is provided with an annular recess 36 in which a retaining ring 37 is engaged to prevent lateral displacement of the elbow and its elongated smooth portion 31 outwardly. It is noted that it is desirable to lubricate the O ring 34 before its installation with any one of the known lubricants, such as Stanoil 35 and molybdenum disulfide powder; silicone compounds; etc.

The outlet end of the elbow 8 of the swivel joint means is provided with an internal screw thread 38 adapted to be engaged by the screw threaded end 40 of the coupling member 41. The other end of the coupling 41 is also screw threaded for engagement in the screw threaded opening in the coupling member 43 at the inner end of the dispensing hose 6.

We have found it desirable to surround the hexagonal headed portion 26 of the bushing 25 with an elastic member 45 which is provided with an anular flange portion 46 which has an annular groove adapted to sealingly engage the periphery of a circular opening formed in the side wall housing 2.

It is to be noted particularly that our improved built in swivel joint means herein disclosed includes two sealing means for the swivel joint means, to wit, the elongated cylindrical surface 31 of the elbow 8 in engagement with the elongated bore 30 of the bushing member 25, and the O ring member 34 sealingly engaging the cylindrical surface 31 and the annular recess 32 in fluid type relationship, to thereby doubly safeguard the swivel joint connection means from any possible leakage of liquid.

We do not desire to limit ourselves to the specific details of the construction as heretofore described, as it is obvious that various modifications may be made therein without deviating from the essential features of our invention.

We claim:

1. In liquid dispensing apparatus which includes a frame, an outer housing surrounding said frame, a meter connected at its inlet to a source of supply of liquid under pressure, a conduit connected to the outlet of said meter, said meter and conduit being within said outer housing, and a flexible dispensing hose having connected thereto at its distal end a valve controlled dispensing nozzle, said hose and said nozzle being outside of said outer housing; a built in swivel joint means connecting the outlet end of said conduit connected to the outlet of said meter and the inlet end of said flexible dispensing hose comprising:

(a) a mounting bracket member rigidly connected to said frame, said mounting bracket member having an elbow member, the inlet end of which is rigidly connected to the outlet end of said conduit connected to the outlet of said meter;

(b) an elongated cylindrical bushing member having an outer head portion extending exteriorly of said outer housing, said bushing member having an inwardly extending outer screw threaded portion rigidly connected to a screw threaded outlet of said elbow member;

(c) an axial elongated smooth cylindrical bore in said bushing member;

(d) an outwardly open annular recess, of larger diameter than the diameter of said bore, formed in the head portion of said bushing member;

(e) an elbow fitting outside said outer housing, said elbow fitting having an elongated inwardly extending portion having an axial opening therethrough and a smooth outer surface rotatably engaging the smooth cylindrical bore in said bushing member in sealing fluid tight relationship, said elongated portion of said elbow fitting being rotatable through 360° turns in said elongated cylindrical bore in said bushing member;

(f) means in said recess of said bushing member sealing said bushing member and said elongated portion of said elbow fitting in fluid tight relationship;

(g) means connecting said flexible dispensing hose, having at its distal end a dispensing nozzle, to the outlet of said elbow fitting outside said outer housing; whereby, said outside elbow fitting with its elongated inwardly extending portion and said flexible dispensing hose and dispensing nozzle may be rotated through 360° turns with respect to the cylindrical bore of said bushing member and with respect to said liquid dispensing apparatus; and, whereby, said swivel joint means is provided with two separate means to prevent possible leakage of fluid at said swivel joint means.

2. In liquid dispensing apparatus which includes a frame, an outer housing surrounding said frame, a meter connected at its inlet to a source of supply of liquid under pressure, a conduit connected to the outlet of said meter, said meter and conduit being within said outer housing, and a flexible dispensing hose having connected thereto at its distal end a valve controlled dispensing nozzle, said hose and said nozzle being outside of said outer housing; a built in swivel joint means connecting the outlet end of said conduit connected to the outlet of said meter and the inlet end of said flexible dispensing hose comprising:

(a) a mounting bracket member rigidly connected to said frame, said mounting bracket member having an elbow member, the inlet end of which is rigidly connected to the outlet end of said conduit connected to the outlet of said meter;

(b) an elongated cylindrical bushing member having an outer head portion extending exteriorly of said outer housing, said bushing member having an inwardly extending outer screw threaded portion rigidly connected to a screw threaded outlet of said elbow member;

(c) an axial elongated smooth cylindrical bore in said bushing member;

(d) an outwardly open annular recess, of larger diameter than the diameter of said bore, formed in the head portion of said bushing member;

(e) an elbow fitting outside said outer housing, said elbow fitting having an elongated inwardly extending portion having an axial opening therethrough and a smooth outer surface rotatably engaging the smooth cylindrical bore in said bushing member in sealing fluid tight relationship, said elongated portion of said elbow fitting being rotatable through 360° turns in said elongated cylindrical bore in said bushing member;

(f) resilient means in said recess of said bushing member sealing said bushing member and said elongated portion of said elbow fitting in fluid tight relationship;

(g) means connecting said flexible dispensing hose, having at its distal end a dispensing nozzle, to the outlet of said elbow fitting outside said outer housing;

whereby, said outside elbow fitting with its elongated inwardly extending portion and said flexible dispensing hose and dispensing nozzle may be rotated through 360° turns with respect to the cylindrical bore of said bushing member and with respect to said liquid dispensing apparatus; and, whereby, said swivel joint means is provided with two separate means to prevent possible leakage of fluid at said swivel joint means.

3. In liquid dispensing apparatus which includes a frame, an outer housing surrounding said frame, a meter connected at its inlet to a source of supply of liquid under pressure, a conduit connected to the outlet of said meter, said meter and conduit being within said outer housing, and a flexible dispensing hose having connected thereto at its distal end a valve controlled dispensing nozzle, said hose and said nozzle being outside of said outer housing; a built in swivel joint means connecting the outlet end of said conduit connected to the outlet of said meter and the inlet end of said flexible dispensing hose comprising:

(a) a mounting bracket member rigidly connected to said frame, said mounting bracket member having an elbow member, the inlet end of which is rigidly connected to the outlet end of said conduit connected to the outlet of said meter;

(b) an elongated cylindrical bushing member having an outer head portion extending exteriorly of said outer housing, said bushing member having an inwardly extending outer screw threaded portion rigidly connected to a screw threaded outlet of said elbow member;

(c) an axial elongated smooth cylindrical bore in said bushing member;

(d) an outwardly open annular recess, of larger diameter than the diameter of said bore, formed in the head portion of said bushing member;

(e) an elbow fitting outside said outer housing, said elbow fitting having an elongated inwardly extending portion having an axial opening therethrough and a smooth outer surface rotatably engaging the smooth cylindrical bore in said bushing member in sealing fluid tight relationship, said elongated portion of said elbow fitting being rotatable through 360° turns in said elongated cylindrical bore in said bushing member;

(f) resilient O ring means in said recess of said bushing member sealing said bushing member and said elongated portion of said elbow fitting in fluid tight relationship;

(g) means connecting said flexible dispensing hose, having at its distal end a dispensing nozzle, to the outlet of said elbow fitting outside said outer housing;

(h) means preventing outward axial movement between said elongated smooth outer surface of said elbow fitting and the elongated smooth cylindrical bore in said housing member;

whereby, said outside elbow fitting with its elongated inwardly extending portion and said flexible dispensing hose and dispensing nozzle may be rotated through 360° turns with respect to the cylindrical bore of said bushing member and with respect to said liquid dispensing apparatus; and, whereby, said swivel joint means is provided with two separate means to prevent possible leakage of fluid at said swivel joint means.

4. In liquid dispensing apparatus which includes a frame, an outer housing surrounding said frame, a meter connected at its inlet to a source of supply of liquid under pressure, a conduit connected to the outlet of said meter, said meter and conduit being within said outer housing, and a flexible dispensing hose having connected thereto at its distal end a valve controlled dispensing nozzle, said hose and said nozzle being outside of said outer housing; a built in swivel joint means connecting the outlet end of said conduit connected to the outlet of said meter and the inlet end of said flexible dispensing hose comprising:

(a) a mounting bracket member rigidly connected to said frame, said mounting bracket member having an elbow member, the inlet end of which is rigidly connected to the outlet end of said conduit connected to the outlet of said meter;

(b) an elongated cylindrical bushing member having an outer head portion extending exteriorly of said outer housing, said bushing member having an inwardly extending outer screw threaded portion rigidly connected to a screw threaded outlet of said elbow member;

(c) an axial elongated smooth cylindrical bore in said bushing member;

(d) an outwardly open annular recess, of larger diameter than the diameter of said bore, formed in the head portion of said bushing member;

(e) an elbow fitting outside said outer housing, said elbow fitting having a reduced diameter elongated inwardly extending portion having an axial opening therethrough and a smooth outer surface rotatably engaging the smooth cylindrical bore in said bushing member in sealing fluid tight relationship, the inner face of the elbow portion of said elbow fitting being in close proximity to the outer face of said bushing member to effect engagement therebetween preventing any substantial inward axial movement between said elongated smooth outer surface of said elbow fitting and the elongated smooth cylindrical bore in said bushing member, said elongated portion of said elbow fitting being rotatable through 360° turns in said elongated cylindrical bore in said bushing member;

(f) means in said recess of said bushing member sealing said bushing member and said elongated portion of said elbow fitting in fluid tight relationship;

(g) means connecting said flexible dispensing hose, having at its distal end a dispensing nozzle, to the outlet of said elbow fitting outside said outer housing;

(h) means preventing outward axial movement between said elongated smooth outer surface of said elbow fitting and the elongated smooth cylindrical bore in said bushing member;

whereby, said outside elbow fitting with its elongated inwardly extending portion and said flexible dispensing hose and dispensing nozzle may be rotated through 360° turns with respect to the cylindrical bore of said bushing member and with respect to said liquid dispensing apparatus; and, whereby, said swivel joint means is provided with two separate means to prevent possible leakage of fluid at said swivel joint means.

References Cited by the Examiner

UNITED STATES PATENTS

| | | | |
|---|---|---|---|
| 524,754 | 8/1894 | Chable | 222—536 |
| 2,182,126 | 12/1939 | Hogarth | 222—530 X |
| 2,240,458 | 4/1941 | Grise | 222—536 X |
| 2,542,588 | 2/1951 | Snow | 222—529 X |
| 2,694,601 | 11/1954 | Higginbotham | 222—529 X |
| 2,930,514 | 3/1960 | Pacey | 222—533 X |
| 3,129,960 | 4/1964 | Schrodt | 285—275 X |

FOREIGN PATENTS 942,975  5/1956  Germany.

RAPHAEL M. LUPO, *Primary Examiner.*